US006127793A

United States Patent [19]

Kerner

[11] Patent Number: 6,127,793

[45] Date of Patent: Oct. 3, 2000

[54] METHOD AND CIRCUIT ARRANGEMENT FOR DETECTING OPTIMAL CONTROLLER PARAMETERS FOR SPEED CONTROL

[75] Inventor: Norbert Kerner, Traunwalchen, Germany

[73] Assignee: Dr. Johannes Heidenhain GmbH, Traunreut, Germany

[21] Appl. No.: 09/130,952

[22] Filed: Aug. 7, 1998

[30] Foreign Application Priority Data

Aug. 7, 1997 [DE] Germany .......................... 197 34 208

[51] Int. Cl.[7] ............................ G05B 13/02; G05B 11/36

[52] U.S. Cl. .......................... 318/561; 318/609; 318/610; 700/37

[58] Field of Search .................................... 318/561, 609, 318/610; 364/152, 157–162; 700/37–43

[56] References Cited

U.S. PATENT DOCUMENTS

| | | | |
|---|---|---|---|
| 3,831,099 | 8/1974 | Diehl | 327/335 |
| 4,549,123 | 10/1985 | Hägglund et al. | 318/610 |
| 4,669,040 | 5/1987 | Pettit et al. | 364/162 |
| 4,679,136 | 7/1987 | Shigemasa | 364/150 |
| 4,754,391 | 6/1988 | Suzuki | 364/157 |
| 4,755,924 | 7/1988 | Hiroi | 364/148.09 |
| 4,768,143 | 8/1988 | Lane et al. | 364/157 |
| 4,881,160 | 11/1989 | Sakai et al. | 364/161 |
| 4,882,526 | 11/1989 | Iino et al. | 318/561 |
| 4,956,593 | 9/1990 | Sakamoto et al. | 318/561 |
| 5,063,335 | 11/1991 | Baechtel et al. | 318/609 |
| 5,157,597 | 10/1992 | Iwashita | 318/562 X |
| 5,159,547 | 10/1992 | Chand | 364/157 |
| 5,223,778 | 6/1993 | Svarovsky et al. | 318/610 |
| 5,263,113 | 11/1993 | Naitoh et al. | 388/815 |
| 5,404,289 | 4/1995 | Hang et al. | 364/148.1 |
| 5,475,291 | 12/1995 | Yoshida et al. | 318/568.22 |
| 5,481,453 | 1/1996 | Desantis | 364/162 |
| 5,568,377 | 10/1996 | Seem et al. | 364/157 |
| 5,587,896 | 12/1996 | Hansen et al. | 364/148.01 |
| 5,625,552 | 4/1997 | Mathur et al. | 364/162 |
| 5,684,375 | 11/1997 | Chaffee et al. | 318/638 |
| 5,847,952 | 12/1998 | Samad | 364/148.03 |
| 5,880,415 | 3/1999 | Colby et al. | 187/393 |
| 5,973,467 | 10/1999 | Eguchi | 318/609 |

FOREIGN PATENT DOCUMENTS

| | | |
|---|---|---|
| 0 523 252 A1 | 1/1993 | European Pat. Off. . |
| 0 347 465 B1 | 12/1993 | European Pat. Off. . |
| 36 18337 C2 | 1/1988 | Germany . |
| 41 32 825 A1 | 4/1992 | Germany . |
| 42 13 795 A1 | 10/1992 | Germany . |
| 43 12 162 A1 | 10/1994 | Germany . |
| 196 17 867 | 11/1997 | Germany . |
| 07093003 | 4/1995 | Japan . |

OTHER PUBLICATIONS

Manfred Reuter, "Regelungstechnik für Ingenieure," (1994); pp. 234–237.

*Primary Examiner*—Brian Sircus
*Attorney, Agent, or Firm*—Brinks Hofer Gilson & Lione

[57] ABSTRACT

A method for detecting optimal controller parameters for a digital speed control is proposed, wherein an rpm control circuit is charged with different test signals, and the resulting rpm progression is determined. This rpm progression is subsequently evaluated with respect to triggering time and transient response for different controller parameters, and thereafter the most advantageous controller parameters are set in the controller of the control circuit.

26 Claims, 2 Drawing Sheets

METHOD AND CIRCUIT ARRANGEMENT FOR DETECTING OPTIMAL CONTROLLER PARAMETERS FOR SPEED CONTROL

FIELD OF THE INVENTION

The invention relates to a method for detecting optimal controller parameters for speed control of an electric motor of a drive subassembly wherein the parameters are determined in branches with different control characteristics which constitute a controller of a control circuit for the electric motor, and wherein the control circuit is excited by test signals. The invention further relates to a circuit arrangement for executing the method.

BACKGROUND OF THE INVENTION

It is known from U.S. Pat. No. 5,157,597 how to detect oscillations in a servo system during operation and to change the loop amplification of control loops. In the process, a characteristic curve is established for the ratio of the amplification of the position control loop with respect to the position deviation in such a way that the loop amplification for defined values of the position deviation assumes a large value. During operation, the position deviation is periodically determined and the main oscillation component of the position deviation is determined. Finally, the loop amplification of the servo system is adjusted in such a way that the main oscillation component falls into a defined frequency range.

A disadvantage, however, lies in that during the running time, the frequency range in which the servo system starts to oscillate is adjusted, but the oscillation tendency is not reduced. Therefore no optimization of the controller parameters takes place. The set frequency range can be displaced in different load stages which can lead to oscillation and therefore to damage of the servo system.

A method for adjusting a PID controller is known from U.S. Pat. No. 4,549,123. In this case a non-linear component whose output signal has either a constant negative or positive amplitude, is connected upstream of the PID controller. Thereafter the controller parameters are changed in such a way that the transfer function of the non-linear component, multiplied by the mutual transfer function of the controller and the control system for a defined amplitude and a defined frequency, results in the value of −1 and the control circuit changed in this way can start to oscillate at this point. Thereafter different core values are calculated in accordance with the equations of Ziegler and Nichols, and the controller is set as a function of the calculated core values.

In this case it is disadvantageous that the entire control structure must be changed, it is not provided to only perform a change of the controller parameters.

It is known from European Patent Publication EP 0 347 465 B1 that a servo motor has a greater tendency to oscillate at a low rpm than at a high rpm. Therefore a control circuit is provided for the servo motor whose amplification in the P and I branches of the controller is set as a function of the rpm. By means of this it is achieved that the servo motor does not start to oscillate at a low rpm, and no unnecessary limitation of the torque takes place at a high rpm.

In this case it is disadvantageous that optimal starting values for a stable operation must already be provided, which thereafter are merely matched to a change in rpm of the electric motor. There is no disclosure of how the starting values are determined.

As a whole, the methods for suppressing oscillations in controlled electric motors which can be found in the prior art, do not take into consideration that an electric motor has been inserted into a mechanical arrangement which can considerably change the oscillating tendency of the entire drive system. Based on additional mechanical components for transferring the movement generated by the electric motor which, when they are employed, are permanently connected with the motor, the determination of the oscillating tendency of only the electric motor is not sufficient.

SUMMARY OF THE INVENTION

It is therefore an object of the invention to disclose a method for the automatic determination of controller parameters for speed regulation wherein oscillating of the entire drive subassemblies is dependably prevented by the controller parameters, while at the same time the required torque of the electric motor is available as exactly as possible so that the set point rpm is reached as rapidly as possible. In this case the controller parameters are to be determined in such a way that effects which are caused by not only the electric motor but also by further components of the drive subassembly, are taken into consideration. In addition, the method should be realizable as simply and cost-effectively as possible.

The method in accordance with the invention has an advantage that during the setting of the controller parameters the electric motor is connected with the other components of the drive subassembly so that, in addition to the influence of the electric motor, the further components of the drive subassembly are taken into consideration. A further advantage lies in that by means of a first pulse-shaped excitation signal of the test signal generator, the drive subassembly is released by means of which minimal damping of the electric motor by the mechanically resiliently connected components is achieved. It is of further advantage that, based on the special test signal, first the P portion and thereafter the I portion, as a function of the already set P portion of the controller, are optimally set.

The invention will be explained in more detail in what follows by the embodiments represented in the drawings.

DETAILED DESCRIPTION OF THE PREFERRED EMBODIMENTS

In what follows it is assumed that the method of the invention for determining optimal controller parameters is used for speed control of a servo motor of a machine tool. However, it is immediately apparent to one skilled in the art that the method of the invention can be employed with any other electric motor whose rpm is to be controlled as rapidly as possible to reach a set point rpm without oscillating, for example, a spindle motor.

Figure 1:
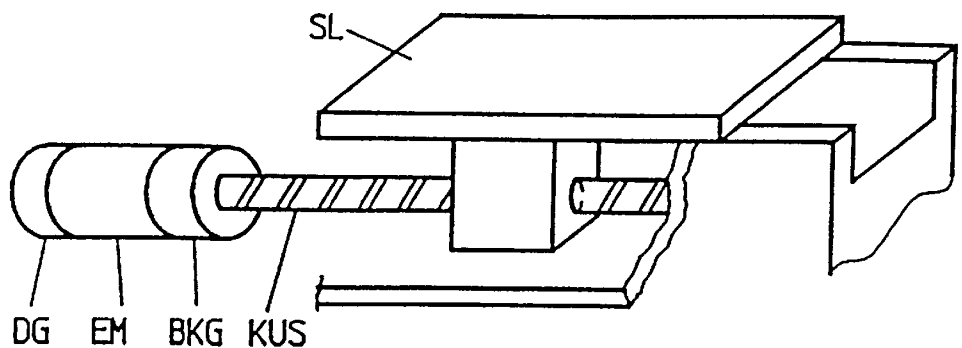
FIG. 1 shows an electromechanical drive subassembly.

FIG. 1 represents an example of a possible drive subassembly wherein an electric motor EM is coupled with an angle encoder DG and further mechanical components, such as the component BKG, for example, which can contain a brake, a clutch and a gear for the electric motor EM. Here it is not absolutely necessary for the component BKG to realize all three functions mentioned. The rotary motion generated by the electric motor EM is passed on via a ballscrew KUS to a carriage SL on which a workpiece can be clamped, so that these two components are also a part of the drive subassembly.

It is absolutely necessary for a plurality of processing steps of workpieces clamped on the carriage that the carriage SL be displaced at a constant speed. The rpm of the electric motor EM is controlled in order to assure this.

Figure 2:
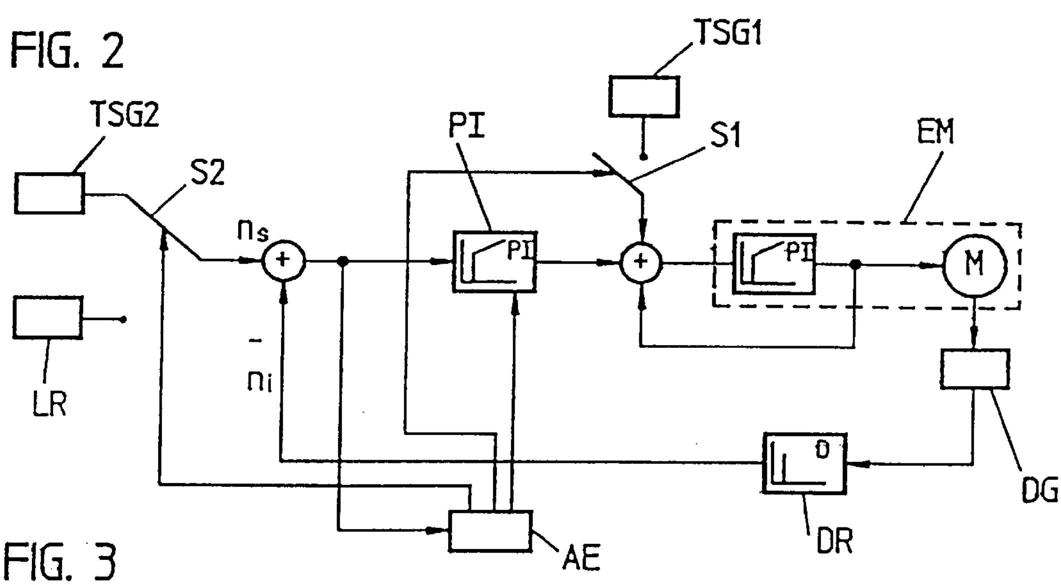
FIG. 2 is a block circuit diagram of a speed control for an electric motor according to a preferred embodiment of the present invention.

FIG. 2 shows a possible control circuit for the rpm control of the electric motor EM. The electric motor EM has an upstream connected current regulator which, however, is of no importance for the present invention. The actual rpm (ni) of the electric motor EM is determined in a differentiator DR by the chronological differentiation of the position values of an angle encoder DG and are added with a negative sign in an adder to the predetermined set point rpm (ns), which represent the command variable.

The control deviation (ns)–(ni) is transmitted to the electric motor EM by a controller PI, which, in particular, has a proportional and an integral branch (P and I branch respectively) with the corresponding P and I control characteristics whose amplifications can be separately set.

Based on its characteristics, the controller PI outputs an input signal which is amplified by the amplification set in the P branch and a sum of input signals which were present over a defined period of time and amplified by the amplification set in the I branch. The present controller PI essentially has such a PI characteristic, but there is also the option that the controller PI has further characteristics.

Furthermore, in accordance with the invention two switches S1 and S2 as well as two test signal generators TSG1 and TSG2 are provided. The test signal generator TSG1 is connected via the switch S1 with an adder, which feeds the sum of the output signals of the controller PI and of the test signal generator TSG1 to the electric motor EM. The output signal of the test signal generator TSG2 can be selected as the command variable through S2. Furthermore, an analysis unit AE is provided, to which the input signal of the controller PI and, through a pickup not represented in FIG. 2, the output signal of the differentiator DR are supplied, and which includes a computing unit as well as a control unit for controlling the switches S1 and S2 as well as the test signal generators TSG1 and TSG2. Furthermore, the control unit also controls the setting of the various amplifications in the branches of the controller P1. In the course of short measuring intervals, the computing unit of the analysis unit AE performs scanning and quantification of the input signal of the controller PI and of the output signal of the differentiator DR, as well as their evaluation and the determination of the various error sources.

So that the control circuit does not oscillate over an extended period of time, i.e., that no undamped oscillation is generated during operation by which the mechanical or electrical components of the entire arrangement in FIG. 1 could be damaged, the two amplifications of the P and I branch of the controller PI are set sequentially one after the other only for the short measuring intervals. Outside of the measuring intervals, amplifications are set in the P and I branches which assuredly prevent an oscillation of the control circuit.

Figure 3:
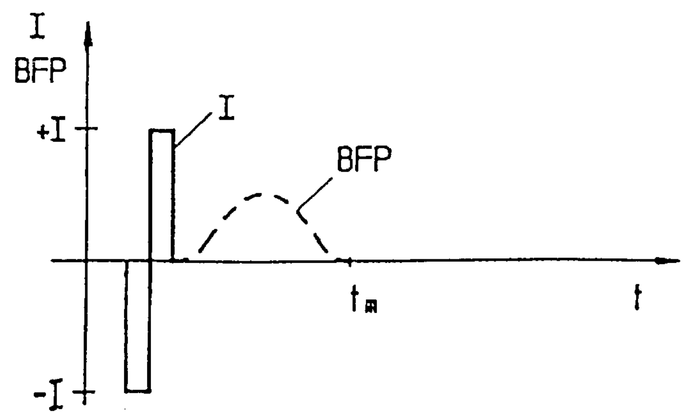
FIG. 3 represents a test signal for determining the amplification of the P portion of the speed controller and an evaluation function for judging its stability.

In a first step, for determining the optimal amplifications in the P branch of the controller PI, the command variable set point rpm (ns) is not preset by a position control circuit LR as in conventional operations, instead a constant value, in particular zero is preset as the set point rpm (ns) via a second switch S2. In addition, the signal of a first test signal generator TSG1 is fed to the control circuit downstream of the controller P1 via a first switch S1. Current pulses are provided to the electric motor EM by means of this which do not exceed the maximally permissible current for the electric motor EM, and a possibly preset current limiting switch is not activated. This current is provided for a very short period of time, for example, the length of a time constant of the control circuit, so that a current pulse is issued to the electric motor EM as represented in FIG. 3 starting at the time $t_o$. Following the current pulse, a possible evaluation function BFP for the actual rpm (ni) which, following the current pulse, is set by the control circuit in the electric motor EM, is represented in FIG. 3.

Before the current pulse is issued, the electric motor is at a stop. Since the tendency to oscillate is greater at the start of operation of the motor than during the motor's operation, it is assured by this that the stability is determined in the unstable state of the electric motor EM.

The rpm of the electric motor EM is scanned and quantized during a short measuring time tm. In case of an unwanted oscillation, the actual rpm (ni) have an undamped or only weakly damped progress. If no oscillation occurs, the rpm (ni) is quickly reduced since in the meantime zero has been set as the set point rpm (ns) by the first test signal generator TSG1, or the latter is cut out of the control circuit via the switch S1. If now, in accordance with Equation (1), below the ratio V of scanning values of the actual rpm (ni), multiplied with an evaluation function BFP, to non-evaluated scanning values of the actual rpm (ni) is calculated, then there is no oscillation, if the ratio is V<1.

$$V = \frac{\sum_{i=0}^{m} \left| ni(t_i) * \left(1 - \cos\left(2\pi \frac{t_i}{t_m}\right)\right) \right|}{\sum_{i=0}^{m} |ni(t_i)|} \tag{1}$$

In connection with the selected evaluation function BFP only care needs to be taken that it should have a value close to zero at the start of the measuring interval, and that the quotient of the sum of the evaluation factors of the evaluation function BFP and the number of evaluation factors must have a result of 1. Otherwise the evaluation function BFP can be arbitrarily selected to a large degree.

This first step is initially performed for a small amplification in the P branch of the controller, so that no oscillation is possible. During this measurement the I branch is deactivated by setting its amplification to very low values or to zero. Thereafter the amplification exclusively in the P branch is increased until the ratio V has almost reached the value 1. Subsequently the value of the amplification for the P branch determined in this way is multiplied by a factor of less than 1, for example by the factor 0.45 in accordance with Ziegler and, and is set in the P branch of the controller P1. Its is assured by this that no oscillation of the electric motor EM can be caused by means of the P branch.

By means of the defined excitation of the electric motor EM by the first test signal generator TSG1 with a pulse-like current it is assured that a reaction to this excitation essentially occurs only through the P branch of the control circuit. In this way it has been possible by means of the selection of the excitation signal of the test signal generator TSG1 to separate the P portion of the controller PI in a particularly simple manner. Since the oscillation tendency of the drive subassembly is greatest from the voltage-free position of rest, the electric motor EM is initially brought into this state by current pulses. After these current pulses have been issued by the test signal generator TSG1, the switch 1 is opened again.

The inverted difference signal of the rpm (ns)–(ni) is picked up for analysis directly upstream of the controller PI. This has the advantage that the stability determination can take place independently of absolute rpm. This is particularly advantageous in connection with vertical shafts, which as a rule do not have their voltage-free and therefore lowest damping state at zero rpm.

In a second step for determining the controller parameters, a set point rpm (ns) is provided to the control circuit by means of a second test signal generator TSG2 for determining the amplification in the I branch, which progresses in accordance with a discontinuous function. To this end, the test signal generator TSG2 is connected via the switch S2 with the input of the control circuit. The set point rpm jump is calculated in such a way that the electric motor EM is not overloaded and no limitation of the current takes place. In the course of this, the jump response of the electric motor EM is scanned and quantized during a short measuring interval.

Thereafter an error function F is calculated in accordance with Equation (2), which consists of the sum of the rpm which lie above the set point rpm (ns) and the square of the sum of the rpm which lie below the set point rpm (ns). In addition, a chronological evaluation of the transient response of the control circuit by an evaluation function BFI takes place in the equation (2).

$$F = \sum_{i=0}^{l} bfi(i) * (ni - ns) + \sum_{j=0}^{k} bfi(j) * (nj - ns)^2 \quad (2)$$

$$\text{with } (ni - ns) > 0 \quad \text{and} \quad (nj - ns) < 0$$

Because of the squaring, the lower deviations of the set point rpm (ns) enter the calculation as errors to a considerably greater extent than the upper deviations of the rpm. In actual use it has been shown that such a linear evaluation of upper rpm deviations and a squared one of lower rpm deviations in with respect to the set point rpm (ns) causes the fastest possible approximation to the set point rpm (ns).

In addition, an evaluation function BFI for weighting the deviations from the rpm is performed in Equation (2). To this end, the summands are additionally multiplied with a coefficient bfi. It is achieved by means of the evaluation function BFI that a first upper deviation of the set point rpm (ns) is almost of no consequence, while a subsequent lower deviation of the set point rpm (ns) is particularly strongly evaluated.

Figure 4:
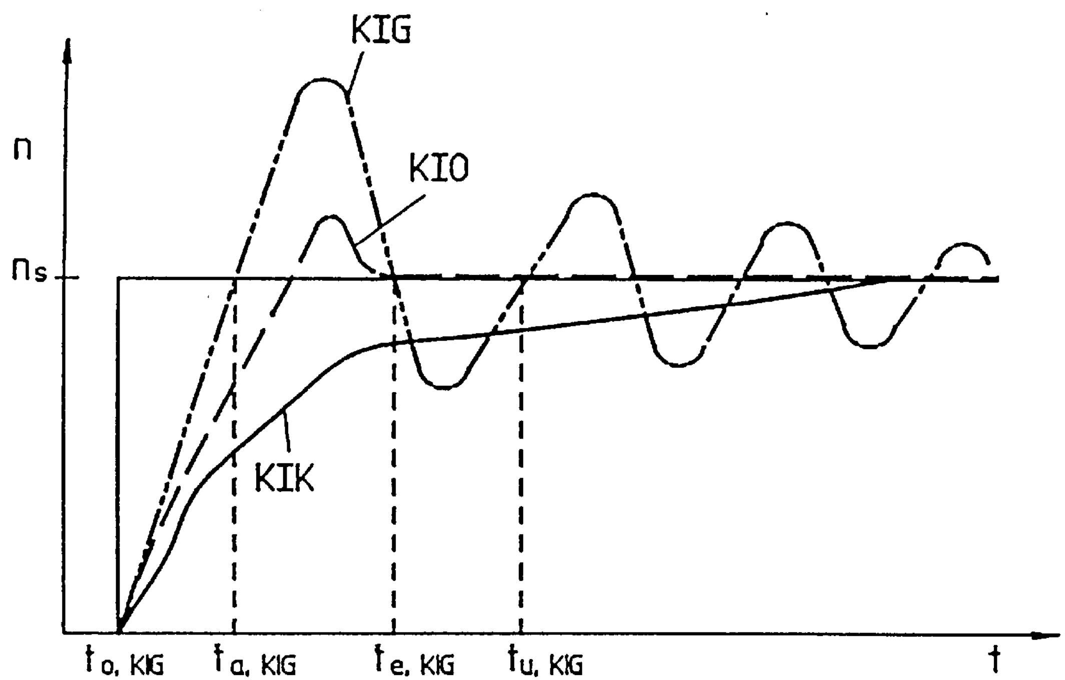
FIG. 4 represents a set point rpm progression and possible actual rpm progressions for different amplifications of the I portion.

FIG. 4 shows different progressions of the actual rpm (ni). The set point rpm (ns) is issued at the time to as the command variable by the second test signal generator TSG2. With too large an amplification in the I branch of the controller PI, the rpm will progress in accordance with the curve KIG, and show many large upper and lower deviations around the set point rpm (ns). With too small an amplification in the I branch, the rpm will progress in accordance with the curve KIK and will only slowly approach the set point rpm (ns). With an almost optimal amplification in the I branch of the controller PI, the actual rpm (ni) shows an almost optimal progression in accordance with the curve KIO and reaches the set point rpm (ns) at the greatest possible speed without post-pulse oscillation. The times $t_a$, $t_e$ and $t_u$ shown relate to the curve KIG.

Figure 5:
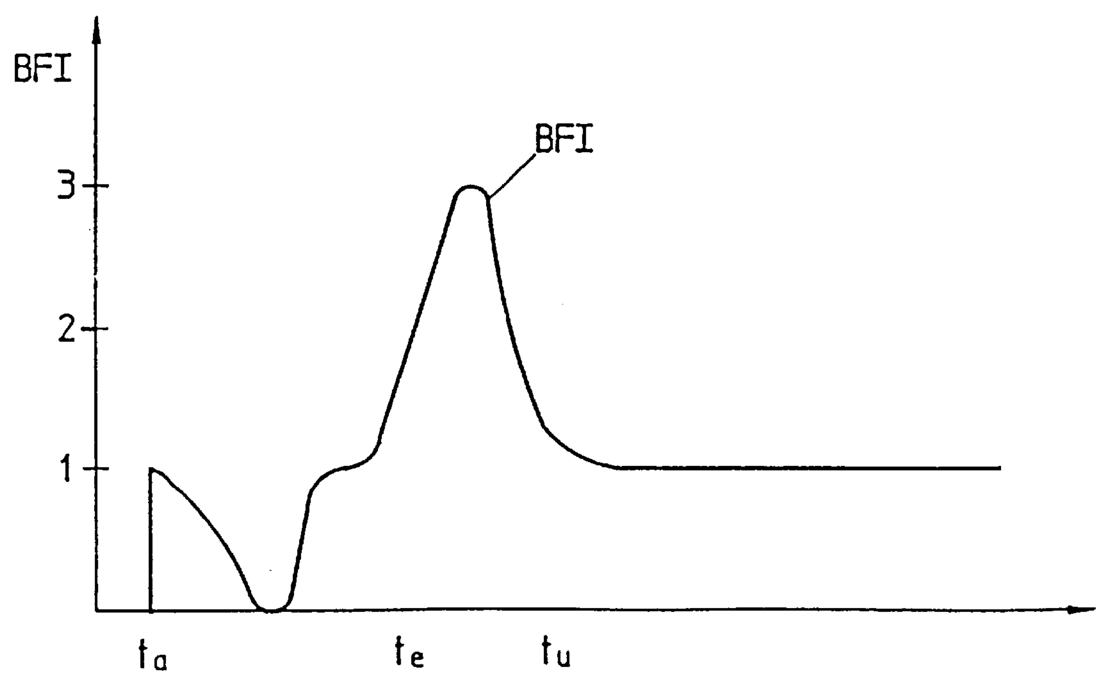
FIG. 5 represents an evaluation function for judging the stability of the I portion of the speed controller.

The progression of the evaluating function BFI for the curve KIG in FIG. 4 is represented in FIG. 5. It can be seen that initially the rpm progression during the time between $t_o$ and $t_a$ is not taken into consideration. Furthermore, the low weighting of the first upper deviation between the times $t_a$ and $t_e$, and the strong evaluation of the first lower deviation between the times $t_e$ and $t_u$ can be seen. After the time $t_u$, the weighting no longer varies. The times $t_u$ and $t_a$ are multiples of $t_a$ and are therefore freshly determined during each measurement. The length of time between $t_u$ and $t_e$ as well as between $t_e$ and $t_a$ respectively corresponds to two and a half times the length between $t_a$ and $t_o$.

In addition to the evaluation of the transient response of the control circuit with respect to the set point rpm (ns), the initial control time $t_a$ until the actual rpm (ni) reaches the set point (ns) for the first time, is evaluated. For this purpose a further error function FF is calculated in accordance with Equation (3).

$$FF = F * t_a^k \text{ with, k=1 . . . 3} \quad (3)$$

When setting the amplification in the I branch, the amplification is reduced, starting at strong amplification, when an oscillation of the drive subassembly occurs, to a minimum of the value FF from Equation (3). Thereafter the amplification is increased again until a noticeable deterioration of the value FF from Equation (3) in the range of 10% is present. Then the value which had been determined directly prior to this is used for the amplification in the I branch.

In an advantageous embodiment the excitation signals for the electric motor EM, issued by the test signal generator TSG1, can be embodied in such a way that immediately following the provision of rpm in the form of a pulse, which excite a current pulse I, an identical excitation signal with a negative sign is provided, as represented in FIG. 3. The additional negative rpm provision in the form of a pulse leads to considerably improved results during the release of the drive subassembly. This results from the fact that because of the resilient mechanical coupling of the electric motor EM with the remaining components of the drive subassembly it is possible to exert a force as a function of the angle of rotation on the rotor of the electric motor EM. Because of the release by means of positive and negative current pulses, the rotor of the electric motor EM moves into a position free of force, which can lie in the positive as well as in the negative direction of rotation.

Furthermore, during the jump-like rpm provision by means of the test signal generator TSG2, an additional excitation signal of the same size, but with a negative sign, is issued immediately following the first excitation signal. Complementing the pulse- and jump-like excitation signals in this way has the advantage that, during the determination of the amplifications in the P and I branches, the rotor of the electric motor EM again has the same initial position. Because of this a position regulator, which in normal operation is superimposed, is not excited to perform a regulation.

There is the further possibility in connection with an excitation by means of a discontinuous function to determine the amplification in the I branch also for the reverse direction of rotation, and to determine the amplification to be set in the I branch on the basis of the two values of the error function FF. This is particularly advantageous in connection with electric motors EM, whose load is a function of the direction of rotation, such as motors for vertical shafts, for example.

The foregoing description of the preferred embodiments of the present invention has been presented for purposes of illustration and description. It is not intended to be exhaustive or to limit the invention to the precise form. Many modifications and variations will be apparent to practitioners skilled in the art.

The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the claims appended hereto and their equivalents.

What is claimed is:

1. A method for detecting optimal parameters for speed control of an electric motor, the method comprising:

determining controller parameters in branches with different control characteristics, which comprises a controller of a control circuit for the electric motor;

exciting the control circuit by different test signals, wherein each of the different test signals is chosen to excite only a defined branch of the controller;

changing the controller parameters until the control circuit shows a normal control behavior and that the controller parameters for one or several branches of the controller determined in this way are set in the appropriate branch of the controller;

supplying a first test signal to the electric motor for setting an amplification in a proportional branch of the controller;

determining a chronological progression of an actual rpm (ni) of the electric motor in a measuring interval and is evaluated by a first evaluation function, starting with a slight amplification in the proportional branch and an integral branch of the controller, increasing the amplification in the proportional branch of the controller until the start of oscillation of the control circuit is detected by the evaluation by the evaluation function;

multiplying the amplification of the proportional branch of the controller at the start of the oscillation by a factor of less than 1 and is set in the proportional branch of the controller;

supplying a second test signal to the control circuit as a command variable for setting the amplification in the integral branch of the controller;

determining the chronological progression of the actual rpm (ni) of the electric motor in a measuring interval, is evaluated by a second evaluation function, and a deviation from a set point rpm (ns) is quantized in the measuring interval by an error function; and starting from a strong amplification, wherein an oscillation occurs, reducing the amplification in the integral branch of the controller until a minimum of the error function is provided, and this amplification is set.

2. The method in accordance with claim 1 wherein a current pulse is used as the first test signal.

3. The method in accordance with claim 2 wherein the amplitude of the current pulse is limited to the maximum permissible current strength for the electric motor.

4. The method in accordance with claim 2 wherein the amplitude of the current pulses is limited to a current strength at which a current limiting device is engaged.

5. The method in accordance with claim 1 wherein two directly successive current pulses, which have the same value but different polarity, are used as the first test signal.

6. The method in accordance with claim 1 wherein a discontinuous function is used as the second test signal.

7. The method in accordance with claim 6 wherein a jump size of the discontinuous function is calculated on the basis of the amplification set in the proportional branch and the maximum permissible current strength for the electric motor.

8. The method in accordance with claim 6 wherein two discontinuous functions are used as the second test signal, wherein the second discontinuous function follows the first discontinuous function immediately in time and has the same jump size but a different sign than that of the first discontinuous function.

9. A circuit arrangement for detecting optimal parameters for speed control of an electric motor the circuit arrangement comprising:

an electric motor with an integrated current regulator, an angle encoder, a differentiator that issues the actual rpm (ni), a controller comprising a first branch and a second branch which, based on the sum of the set point rpm (ns) and the actual rpm (ni), controls the motor current, a first adder connected between the controller and the electric motor;

a first test signal generator to provide a first test signal to excite the first branch of the controller;

a first switch to selectively connect the first test signal generator with the first adder;

a second adder that adds an inverted output signal of the differentiator to the command variable, which is the set point rpm (ns);

a second test signal generator to provide a second test signal to excite the second branch of the controller, wherein the second test signal is different than the first test signal;

a second switch to selectively connect the second test signal generator with the second adder;

an analysis unit connected with the first switch and the second switch to selectively control the excitation of the controller by one of the first and second test signals.

10. The circuit arrangement in accordance with claim 9 wherein the analysis unit comprises a control device for controlling the first and second switches and the first and second test signal generator, and that the analysis unit is connected with the controller for changing controller parameters.

11. The circuit arrangement in accordance with claim 9 wherein the analysis unit comprises a computing unit, a control unit and a memory unit.

12. A machine tool in accordance with claim 13 wherein the circuit arrangement in accordance with the invention is employed for a speed control of a shaft drive and a spindle drive.

13. The circuit arrangement in accordance with claim 9, wherein the analysis unit receives an input signal from the controller and an output signal from the differentiator.

14. A method for detecting optimal parameters of a controller of a control circuit of an electric motor, wherein controller parameters in branches with different control characteristics are determined by exciting the control circuit by test signals and changing the controller parameters until the control circuit shows a normal control behavior and the controller parameters for one or several branches of the controller determined in this way are set in the appropriate branch of the controller, the method comprising:

supplying a first test signal to the electric motor for setting an amplification in a proportional branch of the controller;

determining a chronological progression of an actual rpm (ni) of the electric motor in a measuring interval and is evaluated by a first evaluation function;

starting with a slight amplification in the proportional branch and an integral branch of the controller, increasing the amplification in the proportional branch of the controller until the start of oscillation of the control circuit is detected by the evaluation by the evaluation function;

multiplying the amplification of the proportional branch of the controller at the start of the oscillation by a factor of less than 1 and is set in the proportional branch of the controller;

supplying a second test signal to the control circuit as a command variable for setting the amplification in the integral branch of the controller;

determining the chronological progression of the actual rpm (ni) of the electric motor in a measuring interval, is evaluated by a second evaluation function, and a deviation from a set point rpm (ns) is quantized in the measuring interval by an error function; and starting from a strong amplification, wherein an oscillation occurs, reducing the amplification in the integral branch of the controller until a minimum of the error function is provided, and this amplification is set.

15. The method in accordance with claim 14, wherein the amplification in the integral branch of the controller is increased until the value of the error function has been increased by a defined percentage, and that this amplification is set.

16. The method in accordance with claim 14, wherein the first evaluation function at the start of the measuring interval has a value approximately equal to zero, and the quotient from the sum of the evaluation factors of the first evaluation function and the number of the evaluation factors has the value 1.

17. The method in accordance with claim 14, wherein a ratio (v) of the rpm progression evaluated by the evaluation function and the non-evaluated rpm progression is determined, and no oscillation is detected at a ratio less than 1.

18. The method in accordance with claim 14, wherein the amplification set in the proportional branch of the controller at the start of the oscillation is multiplied by a factor approximately equal to 0.45.

19. The method in accordance with claim 14, wherein a discontinuous function is used as the second test signal.

20. The method in accordance with claim 19, wherein a jump size of the discontinuous function is calculated on the basis of the amplification set in the proportional branch and the maximum permissible current strength for the electric motor.

21. The method in accordance with claim 19 wherein two discontinuous functions are used as the second test signal, wherein the second discontinuous function follows the first discontinuous function immediately in time and has the same jump size but a different sign than that of the first discontinuous function.

22. A method for detecting optimal parameters for speed control of an electric motor, the method comprising:

determining controller parameters in branches with different control characteristics, which comprises a controller of a control circuit for the electric motor, exciting the control circuit by different test signals, wherein each of the different test signals is chosen to excite only a defined branch of the controller;

changing the controller parameters until the control circuit shows a normal control behavior and that the controller parameters for one or several branches of the controller determined in this way are set in the appropriate branch of the controller; and supplying a current pulse as a test signal to the electric motor for setting an amplification in a proportional branch of the controller.

23. The method in accordance with claim 22 wherein the amplitude of the current pulse is limited to the maximum permissible current strength for the electric motor.

24. The method in accordance with claim 22 wherein the amplitude of the current pulse is limited to a current strength at which a current limiting device is engaged.

25. A method for detecting optimal parameters for speed control of an electric motor, the method comprising:

determining controller parameters in branches with different control characteristics, which comprises a controller of a control circuit for the electric motor, exciting the control circuit by different test signals, wherein each of the different test signals is chosen to excite only a defined branch of the controller;

changing the controller parameters until the control circuit shows a normal control behavior and that the controller parameters for one or several branches of the controller determined in this way are set in the appropriate branch of the controller; and supplying two directly successive current pulses as a test signal to the electric motor for setting an amplification in a proportional branch of the controller, wherein the two directly successive current pulses have the same value but different polarity.

26. A method for detecting optimal parameters for speed control of an electric motor, the method comprising:

determining controller parameters in branches with different control characteristics, which comprises a controller of a control circuit for the electric motor, exciting the control circuit by different test signals, wherein each of the different test signals is chosen to excite only a defined branch of the controller; and changing the controller parameters until the control circuit shows a normal control behavior and that the controller parameters for one or several branches of the controller determined in this way are set in the appropriate branch of the controller; and supplying a test signal in the form of a discontinuous function to the control circuit as a command variable for setting the amplification in an integral branch of the controller.

* * * * *

UNITED STATES PATENT AND TRADEMARK OFFICE

CERTIFICATE OF CORRECTION

PATENT NO. : 6,127,793
DATED : October 3, 2000
INVENTOR(S) : Norbert Kerner

It is certified that error appears in the above-identified patent and that said Letters Patent is hereby corrected as shown below:

Claim 1,
Line 19, change "function," to -- function; --.

Claim 12,
Line 1, change "13" to -- 9 --.

Signed and Sealed this

Eleventh Day of December, 2001

*Attest:*

Nicholas P. Godici

NICHOLAS P. GODICI

*Attesting Officer*

*Acting Director of the United States Patent and Trademark Office*